United States Patent
Nomura

(10) Patent No.: US 12,259,053 B2
(45) Date of Patent: Mar. 25, 2025

(54) EXHAUST VALVE

(71) Applicant: SANKEI GIKEN KOGYO CO., LTD., Tokyo (JP)

(72) Inventor: Tetsuaki Nomura, Isesaki (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 7 days.

(21) Appl. No.: 18/283,288

(22) PCT Filed: Mar. 26, 2021

(86) PCT No.: PCT/JP2021/013159
§ 371 (c)(1),
(2) Date: Sep. 21, 2023

(87) PCT Pub. No.: WO2022/201559
PCT Pub. Date: Sep. 29, 2022

(65) Prior Publication Data
US 2024/0175507 A1 May 30, 2024

(51) Int. Cl.
*F16K 1/22* (2006.01)
*F02D 9/10* (2006.01)
*F16K 1/226* (2006.01)
*F16K 27/02* (2006.01)

(52) U.S. Cl.
CPC .......... *F16K 27/0218* (2013.01); *F02D 9/10* (2013.01); *F16K 1/2263* (2013.01)

(58) Field of Classification Search
CPC .... F16K 1/222; F16K 1/2263; F16K 27/0218; F02D 9/10
See application file for complete search history.

(56) References Cited

U.S. PATENT DOCUMENTS

| 6,138,640 A | 10/2000 | Asanuma et al. |
| 10,167,785 B2 | 1/2019 | Oblinger et al. |
| 2002/0104981 A1 | 8/2002 | Gnage et al. |

(Continued)

FOREIGN PATENT DOCUMENTS

| EP | 2079911 B1 | 12/2011 |
| JP | H6-80840 U | 11/1994 |

(Continued)

OTHER PUBLICATIONS

International Search Report dated Jun. 8, 2021, issued in counterpart International Application No. PCT/JP2021/013159. (2 pages).

*Primary Examiner* — Kelsey E Cary
(74) *Attorney, Agent, or Firm* — WHDA, LLP

(57) ABSTRACT

An exhaust valve includes a pipe body connecting an upstream pipe and a downstream pipe for exhaust, a valve plate disposed inside the pipe body in a state of being attached to a rotary shaft that rotates by drive of an actuator, the valve plate configured to rotate to open/close an exhaust flow path inside the pipe body, and a stopper fixed inside the pipe body and configured to come into contact with the valve plate in a closed state. In the stopper, at least one of an upstream contact surface at which the valve plate makes contact and a downstream contact surface at which the valve plate makes contact runs along an inner peripheral surface of the pipe body at a position closer to an upstream side or a downstream side of the exhaust than an outer periphery of the rotary shaft.

2 Claims, 6 Drawing Sheets

(56) References Cited

U.S. PATENT DOCUMENTS

| | | | |
|---|---|---|---|
| 2002/0117646 A1* | 8/2002 | Jessberger | F16K 27/0218 |
| | | | 251/305 |
| 2017/0089270 A1* | 3/2017 | Oblinger | F16K 1/222 |
| 2018/0128189 A1* | 5/2018 | Varelis | F02D 9/107 |
| 2018/0135497 A1 | 5/2018 | Stark et al. | |
| 2021/0131333 A1* | 5/2021 | De Matos | F02M 26/10 |

FOREIGN PATENT DOCUMENTS

| | | |
|---|---|---|
| JP | 2000-18055 A | 1/2000 |
| JP | 2006-105094 A | 4/2006 |
| WO | 2008/043754 A1 | 4/2008 |

* cited by examiner

EXHAUST VALVE

TECHNICAL FIELD

The present invention relates to an exhaust valve that is installed in an exhaust path through which exhaust from an automobile or the like flows and that uses an open/close operation to regulate a flow rate of the exhaust and exhaust noise.

BACKGROUND ART

In the related art, the exhaust valve described in Patent Document 1 is known as an exhaust valve that is installed in an exhaust path through which exhaust from an automobile or the like flows and that uses an open/close operation to regulate a flow rate of the exhaust. In the exhaust valve of Patent Document 1, a pipe body that connects an upstream pipe and a downstream pipe for exhaust is installed, a shutter that rotates in response to rotation of a rotary shaft when driven by an actuator is installed in the pipe body, a substantially arc-shaped first stopper and a substantially arc-shaped second stopper, each disposed on a downstream side and an upstream side of the pipe body, respectively, are attached by welding to an inner surface of the pipe body, and an annular contact wall of the rotating shutter comes into contact with the substantially arc-shaped first stopper and the substantially arc-shaped second stopper at a position at which the shutter closes the exhaust path.

The annular contact wall of the shutter in this exhaust valve is formed to spread across substantially the same plane as the center axis of the rotary shaft. Further, a contact surface of the substantially arc-shaped first stopper and a contact surface of the substantially arc-shaped second stopper are disposed in a substantially vertical plane with respect to the pipe axis of the pipe body, and the annular contact wall in a closed state comes into contact with the contact surface of the first stopper and the contact surface of the second stopper disposed in the substantially vertical plane with respect to the pipe axis of the pipe body.

CITED DOCUMENTS

Patent Literature

Patent Document 1: U.S. Pat. No. 10,167,785 B

SUMMARY OF INVENTION

Problem to be Solved by Invention

However, in a configuration like that of the exhaust valve of Patent Document 1 in which the contact surface of the first stopper and the contact surface of the second stopper are disposed in a substantially vertical plane and the annular contact wall of the shutter that spreads across substantially the same plane as the center axis of the rotary shaft is made to come into contact with the contact surface of the first stopper and the contact surface of the second stopper, the contact surface of the first stopper and the contact surface of the second stopper need to be formed short to avoid contact and interference with a root portion of the rotary shaft of the shutter. Forming the contact surfaces of the stoppers in a short shape that avoids contact with the root portion of the rotary shaft generates a large gap in the vicinity of the root of the rotary shaft. This gap causes an increase in the amount of exhaust leakage when the exhaust path is closed and makes it difficult to regulate the exhaust amount and exhaust noise to a desired exhaust amount and exhaust noise.

The present invention has been made in view of the above-described problems, and an object of the present invention is to provide an exhaust valve that can improve sealing performance in a closed state and with which an exhaust amount and exhaust noise can be regulated with high performance. Another object of the present invention is to provide an exhaust valve that can improve sealing properties in a closed state at low cost and without an increase in the number of components.

Solution to Problem

An exhaust valve according to the present invention includes a pipe body connecting an upstream pipe and a downstream pipe for exhaust, a valve plate disposed inside the pipe body in a state of being attached to a rotary shaft that rotates by drive of an actuator, the valve plate configured to rotate to open/close an exhaust flow path inside the pipe body, and a stopper fixed inside the pipe body and configured to come into contact with the valve plate in a closed state, in which, in the stopper, at least one of an upstream contact surface at which the valve plate makes contact and a downstream contact surface at which the valve plate makes contact runs along an inner peripheral surface of the pipe body at a position closer to an upstream side or a downstream side of the exhaust than an outer periphery of the rotary shaft, and the valve plate comes into contact with the upstream contact surface and the downstream contact surface at a position at which the valve plate closes the exhaust flow path.

With this configuration, since at least one of the upstream contact surface and the downstream contact surface of the stopper is disposed at a position closer to the upstream side or the downstream side of the exhaust than the outer periphery of the rotary shaft, the upstream contact surface or the downstream contact surface can be disposed at positions not in contact with the root portion of the rotary shaft of the valve plate, there is no need to shorten the contact surfaces of the stopper to prevent contact with the root portion of the rotary shaft, and the generation of large gaps at the root portion of the rotary shaft can be prevented. Accordingly, leakage of the exhaust can be eliminated or reduced to the extent possible, sealing properties in the closed state can be improved, and a flow rate of the exhaust and exhaust noise can be regulated with high performance. Moreover, leakage of the exhaust can be eliminated or reduced to the extent possible without using a separate member for improving sealing properties, and sealing properties of the exhaust valve in the closed state can be improved at low cost without an increase in the number of components.

In the exhaust valve according to the present invention, the valve plate is formed in a stepped shape in which a first flat plate portion and a second flat plate portion are provided continuously via a curved plate portion disposed substantially along an outer peripheral surface of the rotary shaft, and, at a position at which the valve plate closes the exhaust flow path, the first flat plate portion formed to have an area larger than the second flat plate portion comes into contact with one of the upstream contact surface and the downstream contact surface provided at a position closer to the upstream side or the downstream side and the second flat plate portion comes into contact with another of the upstream contact surface and the downstream contact surface.

With this configuration, since the valve plate has a stepped shape in which the first flat plate portion and the second flat plate portion having different areas are continuous via the curved plate portion, the valve plate can have a shape that stably makes contact with the contact surface of the stopper provided at a position closer to the upstream side or the downstream side than the rotary shaft. Further, a partial formation process for avoiding the root portion of the rotary shaft is not required, the shape of the valve plate can be simplified, and the valve plate can be manufactured in a shape easily achieved by a pressing process or the like and achieving low manufacturing costs. In addition, since the curved plate portion is disposed substantially along the outer peripheral surface of the rotary shaft to yield a structure of the rotary shaft and the valve plate, the valve plate can be accurately positioned relative to the rotary shaft, fixing work can be facilitated, and the valve plate is fixed by welding or the like in a region in which the curved plate portion and the outer peripheral surface of the rotary shaft are substantially aligned. Accordingly, the valve plate can be strongly fixed to the rotary shaft.

In the exhaust valve according to the present invention, a portion of the upstream contact surface or the downstream contact surface provided at a position closer to the upstream side or the downstream side than the outer periphery of the rotary shaft is disposed at a position overlapping, in an axial direction of the pipe body, one root portion of the rotary shaft.

With this configuration, exhaust leakage in the vicinity of one root portion of the rotary shaft can be more reliably prevented and sealing properties in the closed state can be further improved.

Effects of Invention

The exhaust valve according to the present invention can improve sealing properties in a closed state and can be used to regulate an exhaust amount and exhaust noise with high performance. In addition, sealing performance in a closed state can be improved at low cost and without an increase in the number of components.

DESCRIPTION OF EMBODIMENTS

Exhaust Valve According to Embodiment

Figure 1:
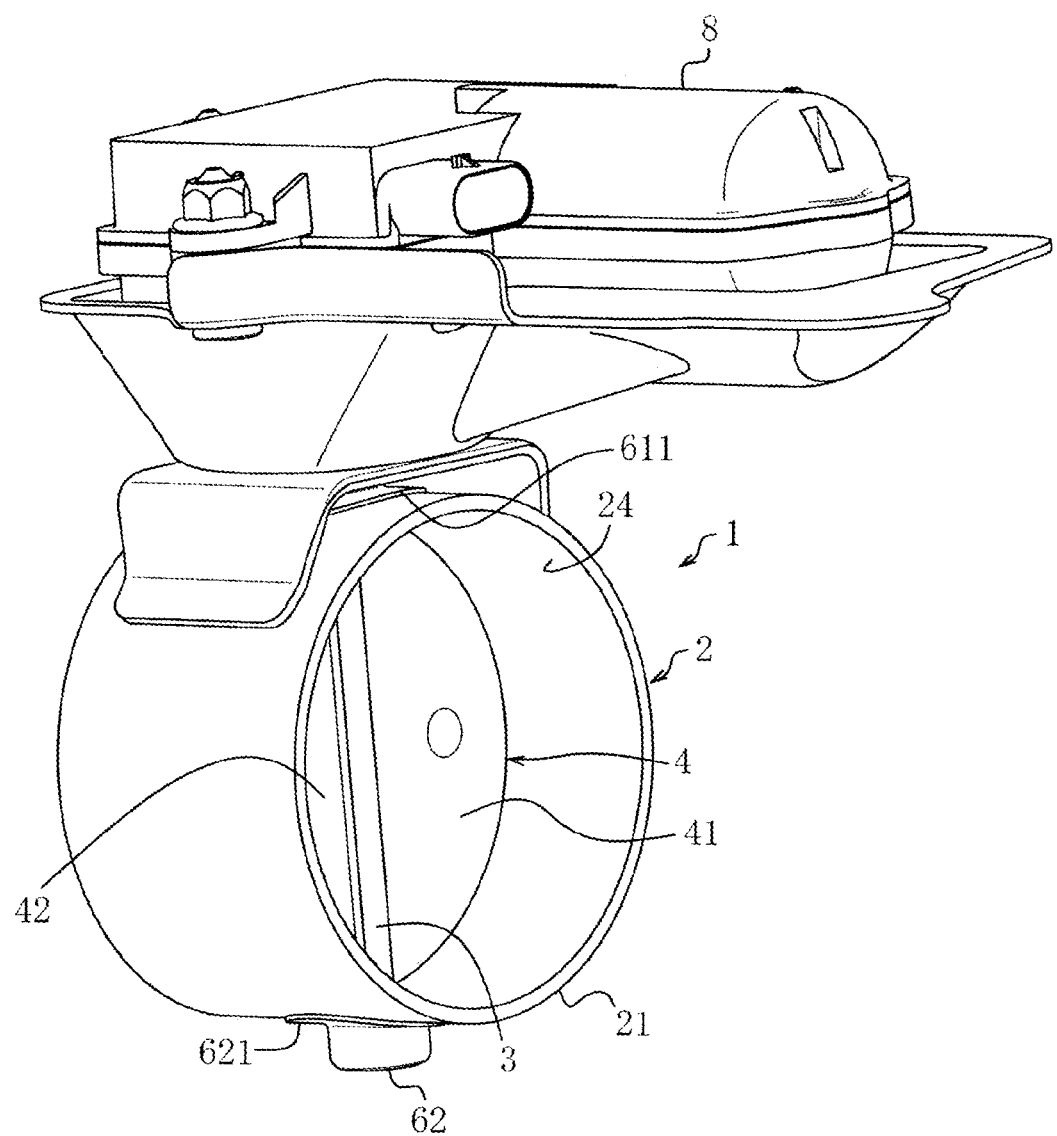
FIG. 1 is a schematic view illustrating a closed state of an exhaust valve according to an embodiment of the present invention.
Figure 2:
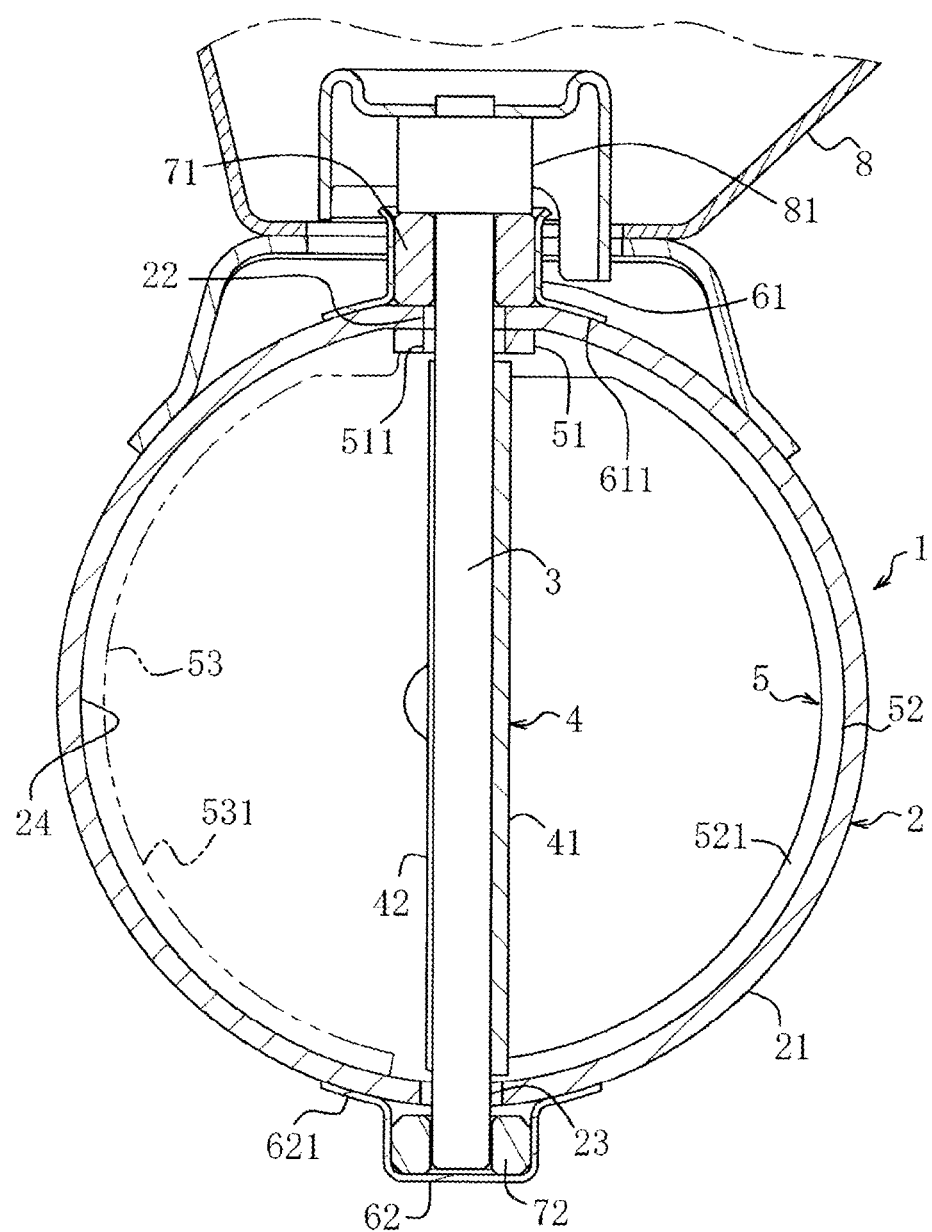
FIG. 2 is a transverse cross-sectional view illustrating an open state of the exhaust valve according to the embodiment.
Figure 3:
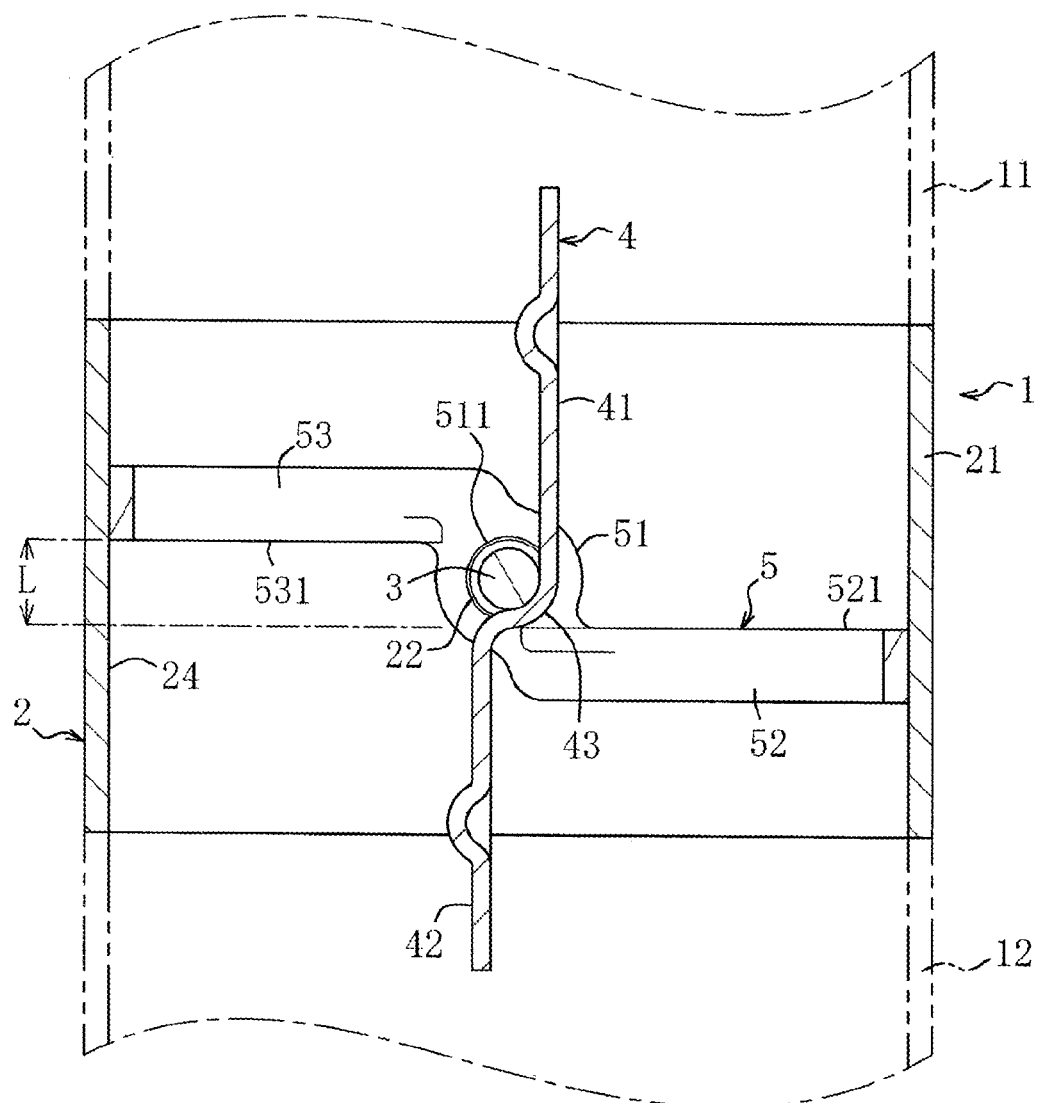
FIG. 3 is a longitudinal cross-sectional view illustrating the open state of the exhaust valve according to the embodiment as viewed from a bottom face side.
Figure 4:
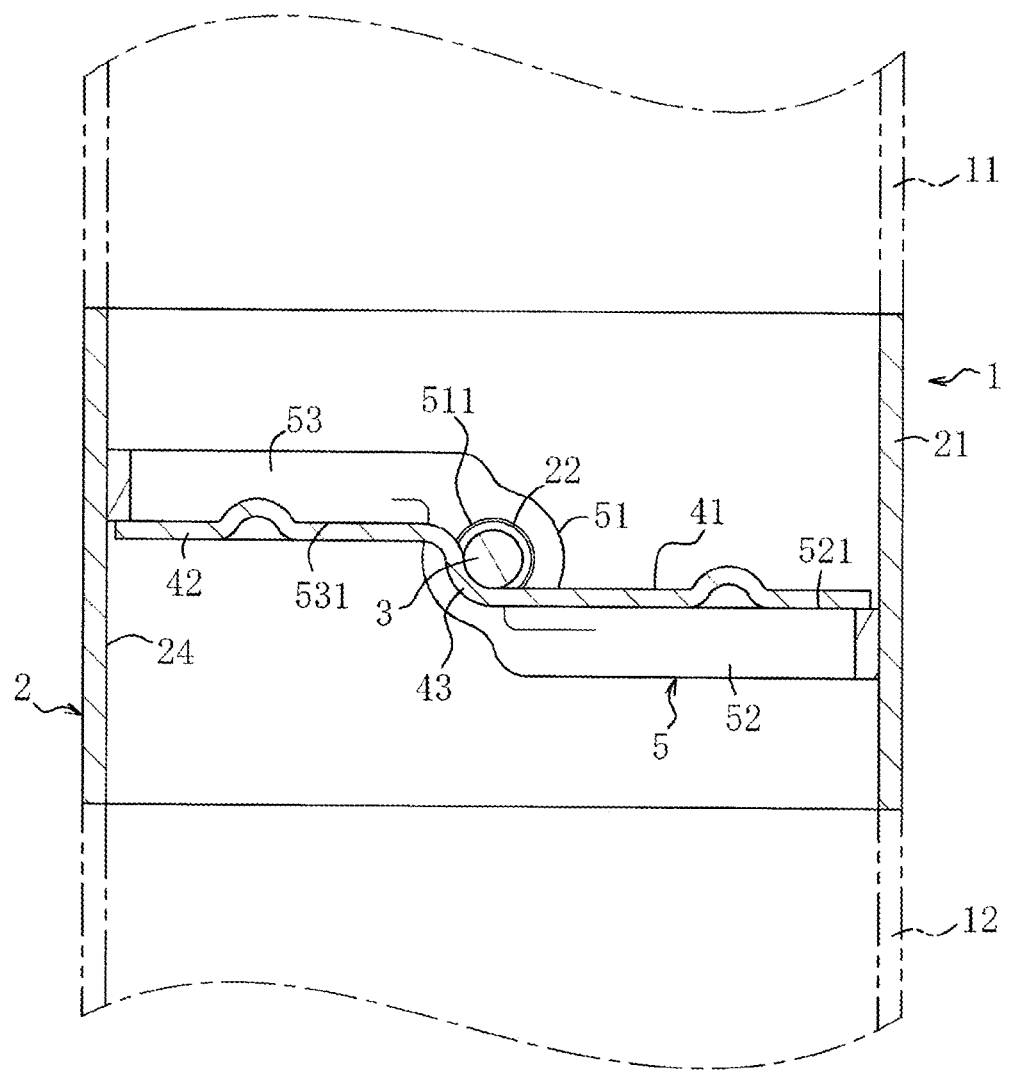
FIG. 4 is a longitudinal cross-sectional view illustrating the closed state of the exhaust valve according to the embodiment as viewed from a bottom face side.

An exhaust valve 1 according to an embodiment of the present invention is installed in an exhaust path through which exhaust of an automobile flows and uses an open/close operation to regulate a flow rate of the exhaust and exhaust noise. As illustrated in FIGS. 1 to 5, the exhaust valve 1 includes a pipe body 2 having a substantially cylindrical shape, a rotary shaft 3 disposed in a direction orthogonal to an axial direction of the pipe body 2 and provided extending through a peripheral wall 21 through a substantial center of the pipe body 2, a valve plate 4 disposed inside of the pipe body 2 in a state of being fixed and attached to the rotary shaft 3, and a stopper 5 fixed inside of the pipe body 2 and configured to come into contact with the valve plate 4 in a closed state.

The pipe body 2 connects an upstream pipe 11 and a downstream pipe 12 for exhaust, which configure the exhaust path. The upstream pipe 11 is fixed to one end portion side of the pipe body 2 in the pipe axial direction, and the downstream pipe 12 is fixed to another end portion side of the pipe body 2. Any method can be used to fix the upstream pipe 11 and the downstream pipe 12 for exhaust to the pipe body 2. Examples of the method include, for example, fixing the upstream pipe 11 to one end portion of the pipe body 2 in the pipe axial direction and the downstream pipe 12 to another end portion of the pipe body 2 by butt welding, internally fitting the upstream pipe 11 to one end portion side of the pipe body 2 in the pipe axial direction and the downstream pipe 12 to another end portion side of the pipe body 2 and fixing the upstream pipe 11 and the downstream pipe 12 to the pipe body 2 by fillet welding or penetration welding, and externally fitting the upstream pipe 11 to one end portion side of the pipe body 2 in the pipe axial direction and the downstream pipe 12 to another end portion side of the pipe body 2 and fixing the upstream pipe 11 and the downstream pipe 12 to the pipe body 2 by fillet welding or penetration welding.

Rotary shaft insertion holes 22 and 23 are formed in the peripheral wall 21 of the pipe body 2 at opposing positions in the radial direction. The rotary shaft 3 is disposed such that one end portion of the rotary shaft 3 in the axial direction is inserted into the rotary shaft insertion hole 22 and another end portion of the rotary shaft 3 is inserted into the rotary shaft insertion hole 23. A bearing case 61 having a substantially hat-like shape and an open apex portion is disposed outward of the rotary shaft insertion hole 22, and a flange portion 611 deformed to a shape matching an outer peripheral surface of the peripheral wall 21 of the pipe body 2 is disposed along the outer peripheral surface of the peripheral wall 21. The flange portion 611 and the peripheral wall 21 are fixed to each other by welding or the like. The bearing case 61 houses a bearing 71 and the bearing 71 axially supports one end portion of the rotary shaft 3 in the axial direction that protrudes outward of the pipe body 2 from the rotary shaft insertion hole 22.

A bearing case 62 having a substantially hat-like shape is disposed outward of the rotary shaft insertion hole 23, and a flange portion 621 deformed to a shape matching the outer peripheral surface of the peripheral wall 21 of the pipe body 2 is disposed along the outer peripheral surface of the peripheral wall 21. The flange portion 621 and the peripheral wall 21 are fixed to each other by welding or the like. The bearing case 62 houses a bearing 72 and the bearing 72 axially supports the other end portion of the rotary shaft 3 in the axial direction that protrudes outward of the pipe body 2 from the rotary shaft insertion hole 23.

The one end portion of the rotary shaft 3 in the axial direction protrudes further outward than the bearing 71 and is coupled to a drive transmission portion 81 of the actuator 8. The rotary shaft 3 is configured to be operated to rotate via the drive transmission portion 81 by drive of the actuator 8. Rotation of the rotary shaft 3 causes the valve plate 4 to rotate and open/close the exhaust flow path in the pipe body 2.

The valve plate 4 is formed in a substantially circular shape in a front view in the illustrated example, and has a stepped shape including, formed integrally, a first flat plate portion 41 having a substantially semicircular shape and a second flat plate portion 42 having a substantially semicircular shape, which are continuous via a curved plate portion 43. The first flat plate portion 41 having a substantially semicircular shape and the second flat plate portion 42 having a substantially semicircular shape are disposed extending substantially in parallel. The first flat plate portion 41 is formed to be longer in the direction orthogonal to the axial direction of the rotary shaft 3 than the second flat plate portion 42 and to have a larger area than the second flat plate portion 42. The curved plate portion 43 provided between the first flat plate portion 41 and the second flat plate portion 42 is disposed substantially along the outer peripheral surface of the rotary shaft 3 and is fixed to the rotary shaft 3 by welding or the like.

As illustrated in FIGS. 2 to 6, the stopper 5 according to the present embodiment is an integrally formed member having a substantially C-shape in a front view: The stopper 5 includes a base portion 51 including an insertion hole 511 configured to receive insertion of the rotary shaft 3, a first contact portion 52 having a substantially arc shape and formed at a position close to the downstream side of the exhaust relative to the base portion 51 and a second contact portion 53 having a substantially arc shape and formed at a position close to the upstream side of the exhaust of the base portion 51. The first contact portion 52 having a substantially arc shape runs along an inner peripheral surface 24 of the pipe body 2, and the second contact portion 53 having a substantially arc shape runs along the inner peripheral surface 24 of the pipe body 2 and extends along a side opposite to the first contact portion 52 in a pipe body circumferential direction, inside of the pipe body 2. The stopper 5 is fixed to the peripheral wall 21 of the pipe body 2 by a welding method such as penetration welding, or the like.

Further, a contact surface 521 of the first contact portion 52 corresponding to a downstream contact surface of the stopper 5 at which the valve plate 4 makes contact runs along the inner peripheral surface 24 of the pipe body 2 at a position closer to the downstream side of the exhaust than an outer periphery of the rotary shaft 3, a contact surface 531 of the second contact portion 53 corresponding to an upstream contact surface of the stopper 5 at which the valve plate 4 makes contact runs along the inner peripheral surface 24 of the pipe body 2 at a position closer to the upstream side of the exhaust than the outer periphery of the rotary shaft 3, and the contact surface 521 corresponding to the downstream contact surface and the contact surface 531 corresponding to the upstream contact surface are disposed at positions in contact with the valve plate 4 having a stepped shape in a state in which the rotating valve plate 4 is at a position at which the valve plate 4 closes the exhaust flow path of the pipe body 2.

Note that, in the present embodiment, a configuration is adopted in which the contact surface 521 corresponding to the downstream contact surface runs along the inner peripheral surface 24 of the pipe body 2 at a position closer to the downstream side of the exhaust than the outer periphery of the rotary shaft 3 and the contact surface 531 corresponding to the upstream contact surface runs along the inner peripheral surface 24 of the pipe body 2 at a position closer to the upstream side of the exhaust than the outer periphery of the rotary shaft 3. However, the exhaust valve according to the present invention may have a configuration in which at least one of the upstream contact surface and the downstream contact surface runs along the inner peripheral surface of the pipe body at a position closer to the upstream side or the downstream side than the outer periphery of the rotary shaft. For example, another satisfactory configuration is a configuration in which the structure of the exhaust valve 1 illustrated in the drawings is changed such that only the contact surface 521 corresponding to the downstream contact surface at which the first flat plate portion 41, which has a larger area than the second flat plate portion 42, makes contact runs along the inner peripheral surface 24 of the pipe body 2 at a position closer to the downstream side of the exhaust than the outer periphery of the rotary shaft 3, and the contact surface 531 corresponding to the upstream contact surface runs along the inner peripheral surface 24 of the pipe body 2 at a position closer to a central axis of the rotary shaft 3 than a position closer to the upstream side of the exhaust than the outer periphery of the rotary shaft 3.

Figure 5:
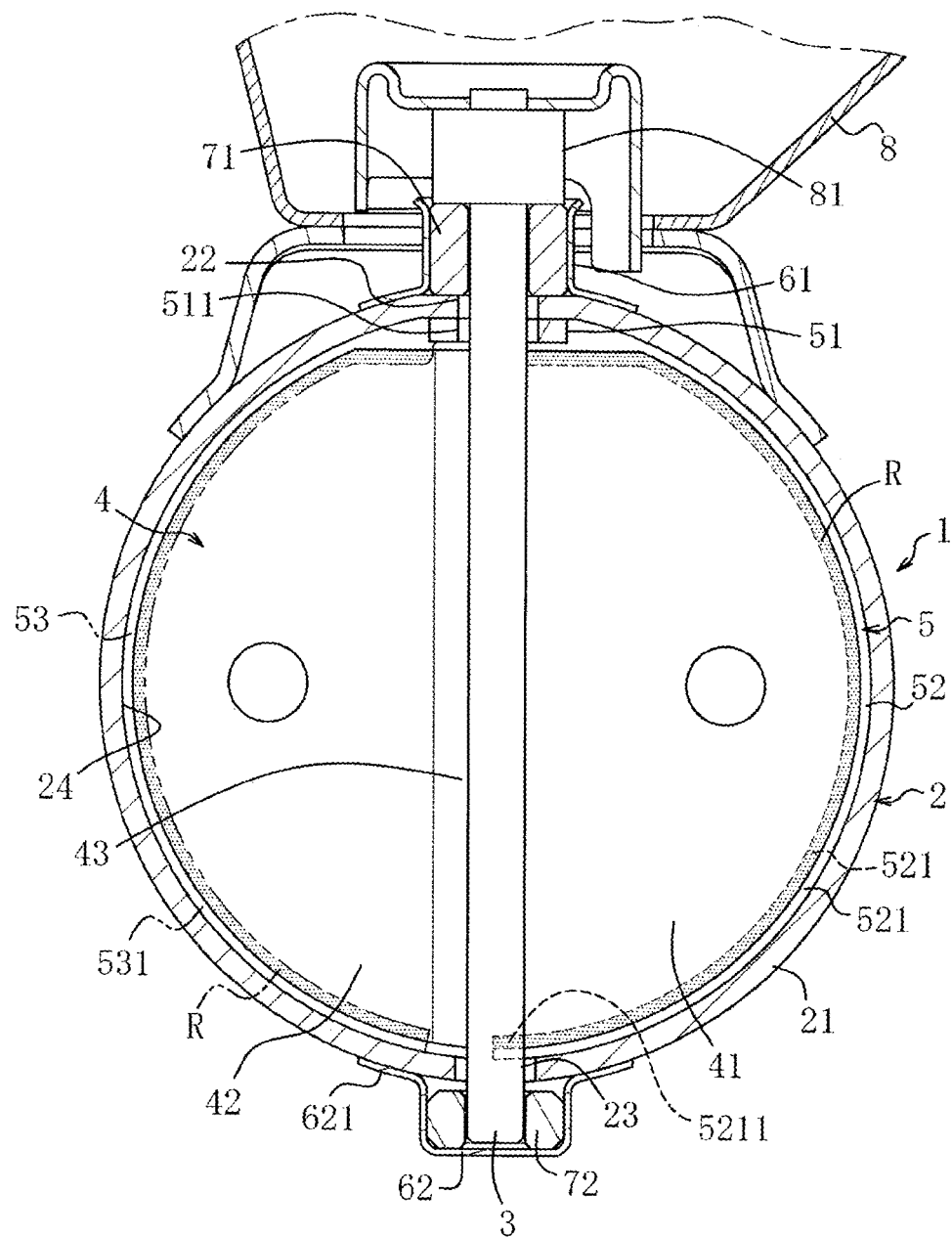
FIG. 5 is a partial cross-sectional view illustrating the closed state of the exhaust valve according to the embodiment.
Figure 6A:
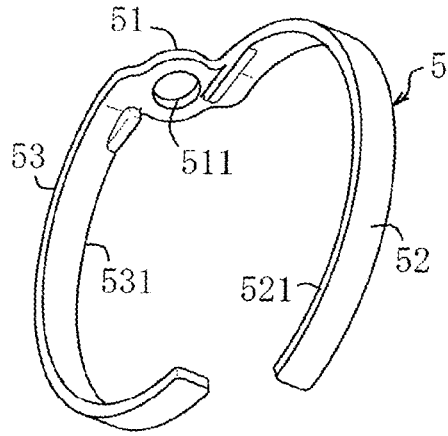
FIG. 6(*a*) is a perspective view of a stopper in the exhaust valve according to the embodiment, FIG. 6(*b*) is a plan view of the stopper, FIG. 6(*c*) is a side view of the stopper, and FIG. 6(*d*) is a bottom view of the stopper.
Figure 6B:
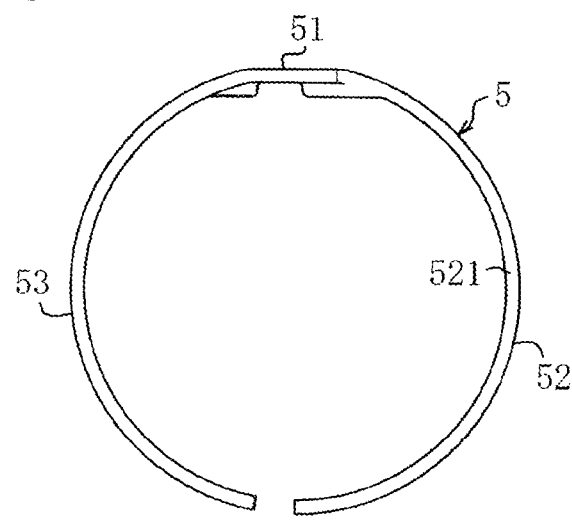
Figure 6C:
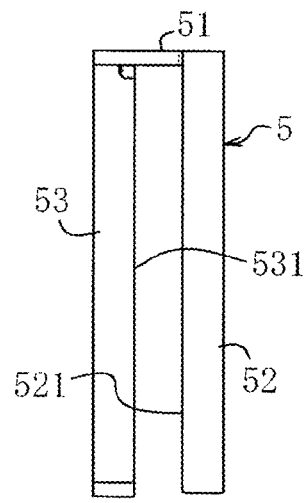
Figure 6D:
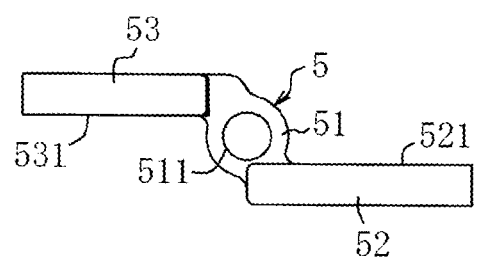

Since the contact surface 521 corresponding to the downstream contact surface and the contact surface 531 corresponding to the upstream contact surface come into contact with the valve plate 4 when the valve plate 4 is at the position of closing the exhaust flow path of the pipe body 2, rotational operation of the valve plate 4 is restricted and a contact region is formed that provides sealing performance by contact. FIG. 5 illustrates the valve plate 4 at the position of closing the exhaust flow path of the pipe body 2 and a contact region R formed when the contact surface 521 corresponding to the downstream contact surface and the contact surface 531 corresponding to the upstream contact surface come into contact with the valve plate 4.

In the present embodiment, in the stopper 5, a distance L, in the axial direction of the pipe body 2, between the contact surface 521 of the first contact portion 52 corresponding to the downstream contact surface and the contact surface 531 of the second contact portion 53 corresponding to the upstream contact surface is set and formed larger than the axial diameter of the rotary shaft 3. A distal end of the first contact portion 52 having a substantially arc shape on the downstream side and a distal end of the second contact portion 53 having a substantially arc shape on the upstream side are configured to not come into contact with a root portion of the rotary shaft 3 in the axial direction located in the vicinity of the rotary shaft insertion hole 23, and to not interfere with the root portion (see FIGS. 3 and 2). Further, a portion 5211 of the contact surface 521 corresponding to the downstream contact surface provided at a position closer to the downstream side than the outer periphery of the rotary shaft 3 is disposed at a position overlapping, in the axial direction of the pipe body 2, the root portion of the rotary shaft 3 located in the vicinity of the rotary shaft insertion hole 23 (see FIG. 5).

In the exhaust valve 1 according to the present embodiment, drive of the actuator 8 is controlled by control performed by a control device (not illustrated), and the rotary shaft 3 and the valve plate 4 are rotated to switch between an open state and a closed state. When the exhaust valve 1 is in the open state, a direction in which surfaces of the first flat plate portion 41 and the second flat plate portion 42 of the valve plate 4 extend follows the exhaust flow path inside the pipe body 2 and the pipe axial direction (see FIGS.

2 and 3). When the exhaust valve 1 is in the closed state, the first flat plate portion 41 and the second flat plate portion 42 of the valve plate 4 are disposed blocking the exhaust flow path inside the pipe body 2, the first flat plate portion 41, which has an area larger than the second flat plate portion 42, abuts against the contact surface 521 corresponding to the downstream contact surface of the first contact portion 52 of the stopper 5 and the second flat plate portion 42 abuts against the contact surface 531 corresponding to the upstream contact surface of the second contact portion 53 of the stopper 5 to close the exhaust path such that exhaust does not flow in the downstream pipe 12 (see FIGS. 1, 4 and 5).

According to the exhaust valve 1 and modifications thereof according to the present embodiment, since one or both of the upstream contact surface and the downstream contact surface of the stopper 5 is disposed at a position closer to the upstream side or the downstream side than the outer periphery of the rotary shaft 3, the upstream contact surface and the downstream contact surface can be disposed at positions not in contact with the root portion of the rotary shaft 3 of the valve plate 4, there is no need to shorten the contact surfaces of the stopper 5 to prevent contact with the root portion of the rotary shaft 3, and the generation of large gaps at the root portion of the rotary shaft 3 can be prevented. Accordingly, leakage of the exhaust can be eliminated or reduced to the extent possible, sealing properties in the closed state can be improved, and a flow rate of the exhaust and exhaust noise can be regulated with high performance. Moreover, leakage of the exhaust can be eliminated or reduced to the extent possible without using a separate member for improving sealing properties and sealing properties of the exhaust valve 1 in the closed state can be improved at low cost without an increase in the number of components.

Further, since the valve plate 4 has a stepped shape with an asymmetrical shape in a cross-sectional view in which the first flat plate portion 41 and the second flat plate portion 42 having different areas are continuous via the curved plate portion 43, the valve plate 4 can have a shape that stably makes contact with the contact surface 521 of the stopper 5 provided at a position closer to the upstream side or the downstream side than the rotary shaft 3 or the like. Further, a partial formation process for avoiding the root portion of the rotary shaft 3 is not required, the shape of the valve plate 4 can be simplified, and the valve plate 4 can be manufactured in a shape easily achieved by a pressing process or the like and achieving low manufacturing costs. In addition, since the curved plate portion 43 is disposed substantially along the outer peripheral surface of the rotary shaft 3 to yield a structure of the rotary shaft 3 and the valve plate 4, the valve plate 4 can be accurately positioned relative to the rotary shaft 3, fixing work can be facilitated, and the valve plate 4 is fixed by welding or the like in a region in which the curved plate portion 43 and the outer peripheral surface of the rotary shaft 3 are substantially aligned. Accordingly, the valve plate 4 can be strongly fixed to the rotary shaft 3.

Further, since the one end portion 5211 of the contact surface 521 corresponding to the downstream contact surface provided at a position closer to the downstream side than the outer periphery of the rotary shaft 3 is disposed at a position overlapping, in the axial direction of the pipe body 2, the root portion of the rotary shaft 3 in the axial direction located in the vicinity of the rotary shaft insertion hole 23, exhaust leakage in the vicinity of the root portion of the rotary shaft 3 positioned in the vicinity of the rotary shaft insertion hole 23 can be more reliably prevented, and sealing properties in the closed state can be further improved.

Scope of Inclusion of Invention Disclosed in Present Specification

The invention disclosed in the present specification includes, in addition to the inventions listed as inventions and embodiments, those specified by changing the partial contents thereof to other contents disclosed in the present specification to an applicable extent, those specified by adding other contents disclosed in the present specification to these contents, or those specified by deleting these partial contents to the extent that a partial action and effect can be obtained and making them into a higher concept. The invention disclosed in the present specification also includes the following modifications and additions.

The applicable stopper in the exhaust valve according to the present invention is not limited to the stopper 5 in the embodiment described above, and may have any configuration provided that the upstream contact surface and the downstream contact surface run along the inner peripheral surface of the pipe body and at least one of the upstream contact surface and the downstream contact surface can be positioned at a position closer to the upstream side or the downstream side of the exhaust than the outer periphery of the rotary shaft. For example, the stopper may be composed of an upstream stopper portion disposed upstream and having a substantially arc piece shape or ring shape and a downstream stopper portion disposed downstream and having a substantially arc piece shape or ring shape, an upstream contact surface of the upstream stopper portion may be disposed at a position closer to the upstream side of the exhaust than the outer periphery of the rotary shaft, a downstream contact surface of the downstream stopper portion may be disposed at a position closer to the downstream side of the exhaust than the outer periphery of the rotary shaft, and the valve plate may come into contact with the upstream contact surface and the downstream contact surface at a position at which the valve plate closes the exhaust flow path.

In the exhaust valve according to the present invention, a portion of the contact surface disposed at a position overlapping the root portion of the rotary shaft in the axial direction of the pipe body may be suitable according to the shape and configuration of the stopper. For example, a portion of the upstream contact surface or a portion of the downstream contact surface, relative to one root portion of the rotary shaft, is suitable. Further, a portion of the upstream contact surface and a portion of the downstream contact surface, relative to one root portion of the rotary shaft, are suitable. Further, a portion of the upstream contact surface or a portion of the downstream contact surface, relative to both root portions of the rotary shaft, is suitable. Furthermore, a portion of the upstream contact surface and a portion of the downstream contact surface, relative to both root portions of the rotary shaft, are suitable.

Additionally, the valve plate in the exhaust valve according to the present invention, is preferably the valve plate 4 having a stepped shape with an asymmetrical shape in a cross-sectional view in which the first flat plate portion 41 and the second flat plate portion 42 according to the embodiment described above are continuous via the curved plate portion 43 disposed substantially along the outer peripheral surface of the rotary shaft 3. However, in the structure that at least one of the upstream contact surface and the downstream contact surface of the stopper is disposed at a position closer to the upstream side or the downstream side, the valve plate may have any shape or configuration provided that the valve plate can come into contact in the closed state with the upstream contact surface and the downstream contact surface of the stopper.

INDUSTRIAL APPLICABILITY

The present invention can be applied to an exhaust valve that is installed in an exhaust path through which exhaust from an automobile or the like flows and that uses an open/close operation to regulate flow rate of the exhaust and exhaust noise.

REFERENCE SIGNS LIST

1 Exhaust valve
2 Pipe body
21 Peripheral wall
22, 23 Rotary shaft insertion hole
24 Inner peripheral surface
3 Rotary shaft
4 Valve plate
41 First flat plate portion
42 Second flat plate portion
43 Curved plate portion
5 Stopper
51 Base portion
511 Insertion hole
52 First contact portion
521 Contact surface
5211 Portion of contact surface disposed at position overlapping root portion of rotary shaft in axial direction of pipe body
53 Second contact portion
531 Contact surface
61, 62 Bearing case
611, 621 Flange portion
71, 72 Bearing
8 Actuator
81 Drive transmission portion
11 Upstream pipe
12 Downstream pipe
R Contact region formed when contact surface of first contact portion and contact surface of second contact portion come into contact with valve plate
L Distance, in axial direction of pipe body, between contact surface of first contact portion and contact surface of second contact portion

The invention claimed is:

1. An exhaust valve comprising:
a pipe body connecting an upstream pipe and a downstream pipe for exhaust;
a valve plate disposed inside the pipe body in a state of being attached to a rotary shaft that rotates by drive of an actuator, the valve plate configured to rotate to open/close an exhaust flow path inside the pipe body; and
a stopper fixed inside the pipe body and configured to come into contact with the valve plate in a closed state, wherein
in the stopper, at least one of an upstream contact surface at which the valve plate makes contact and a downstream contact surface at which the valve plate makes contact runs along an inner peripheral surface of the pipe body at a position closer to an upstream side or a downstream side of the exhaust than an outer periphery of the rotary shaft, and
the valve plate comes into contact with the upstream contact surface and the downstream contact surface at a position at which the valve plate closes the exhaust flow path,
wherein an end portion of the upstream contact surface or the downstream contact surface is extended to a position overlapping, in an axial direction of the pipe body, one root portion of the rotary shaft, the end portion of the upstream contact surface or the downstream contact surface is positioned on the upstream side or the downstream side of the one root portion of the rotary shaft.

2. The exhaust valve according to claim 1, wherein
the valve plate is formed in a stepped shape in which a first flat plate portion and a second flat plate portion are provided continuously via a curved plate portion disposed substantially along an outer peripheral surface of the rotary shaft, and
at a position at which the valve plate closes the exhaust flow path, the first flat plate portion formed to have an area larger than the second flat plate portion comes into contact with one of the upstream contact surface and the downstream contact surface provided at a position closer to the upstream side or the downstream side and the second flat plate portion comes into contact with another of the upstream contact surface and the downstream contact surface.

* * * * *